(12) United States Patent
Sherlin (10) Patent No.: US 9,995,107 B2
(45) Date of Patent: Jun. 12, 2018

(54) OPTIMIZED COMPOSITE DOWNHOLE TOOL FOR WELL COMPLETION

(71) Applicant: CCDI COMPOSITES, INC., Santa Ana, CA (US)

(72) Inventor: Dennis Sherlin, Hacienda Heights, CA (US)

(73) Assignee: CCDI Composites, Inc., Santa Ana, CA (US)

( * ) Notice: Subject to any disclaimer, the term of this patent is extended or adjusted under 35 U.S.C. 154(b) by 635 days.

(21) Appl. No.: 14/062,501

(22) Filed: Oct. 24, 2013

(65) Prior Publication Data

US 2014/0116677 A1    May 1, 2014

Related U.S. Application Data

(60) Provisional application No. 61/719,823, filed on Oct. 29, 2012.

(51) Int. Cl.
| | | |
|---|---|---|
| *E21B 33/134* | (2006.01) | |
| *B29C 70/46* | (2006.01) | |
| *B29C 70/30* | (2006.01) | |
| *B29C 43/18* | (2006.01) | |

(52) U.S. Cl.
CPC ............ *E21B 33/134* (2013.01); *B29C 70/30* (2013.01); *B29C 70/462* (2013.01); *B29C 43/18* (2013.01)

(58) Field of Classification Search
CPC .............................. E21B 33/13; E21B 33/134
See application file for complete search history.

(56) References Cited

U.S. PATENT DOCUMENTS

| | | | | |
|---|---|---|---|---|
| 6,167,963 | B1 * | 1/2001 | McMahan ........... | E21B 33/1204 166/118 |
| 2002/0029880 | A1 * | 3/2002 | Slup ................... | E21B 33/1204 166/118 |
| 2005/0121201 | A1 * | 6/2005 | Turley ................. | E21B 33/134 166/376 |
| 2007/0074873 | A1 * | 4/2007 | McKeachnie ....... | E21B 33/1294 166/376 |
| 2007/0119600 | A1 * | 5/2007 | Slup ..................... | E21B 33/134 166/387 |
| 2013/0112412 | A1 * | 5/2013 | Frazier ................ | E21B 33/1204 166/298 |
| 2013/0213665 | A1 * | 8/2013 | O'Malley ............. | E21B 33/134 166/373 |
| 2014/0014339 | A1 * | 1/2014 | O'Malley ............. | E21B 43/261 166/281 |

\* cited by examiner

*Primary Examiner* — David J Bagnell
*Assistant Examiner* — Michael A Goodwin
(74) *Attorney, Agent, or Firm* — Klein, O'Neill & Singh, LLP (57) ABSTRACT

A composite cone assembly for use with a frac or bridge plug system is discussed herein having shaped outer contours and the strength needed for high pressure applications but with reduced machining requirements by forming part of the cone assembly from a high strength fiber material and the contoured surface from molding, such as from injection molding or compression molding.

23 Claims, 5 Drawing Sheets

OPTIMIZED COMPOSITE DOWNHOLE TOOL FOR WELL COMPLETION

BACKGROUND

In oil and gas well completion operations, frac or bridge plugs are necessary for zonal isolation and multi-zone hydraulic fracturing processes. The advantages of frac and bridge plugs made primarily from composite materials is well established since these products significantly reduce drill-out (removal) time compared to all metallic frac and bridge plugs. However, as drilling for oil and gas extends deeper and/or fracking pressures increase, composite frac and bridge plugs are now expected to meet higher operating pressures and temperatures. Higher temperatures and pressures put severe stresses on the composite frac or bridge plug components that are thought to already operate at or near their operating limits. It is therefore necessary to optimize the design of the composite frac or bridge plug components to meet still yet higher operational requirements with necessary strength. It is also necessary to optimize downhole tools for lower cost since they are an expendable item in well completion.

A typical frac or bridge plug is configured to be positioned in and seals a well casing pipe by actuating serrated wedge slips that dig into the inner wall of the casing as the frac or bridge plug is set. There are typically 4-8 serrated wedge slip elements that are forced out against the well pipe casing by tapered cones located on the frac or bridge plug mandrel that have flat notches machined into the outer surface. The notches in the cone act as a guide for the slips and provide the inclined wedge necessary to force the slips into the well pipe inner wall when the frac or bridge plug is set.

As a result of these complex outer surface features, both the upper and lower cones of a frac or bridge plug are difficult to make and therefore expensive. The lower cone in a typical frac or bridge plug is more highly loaded in operation than the upper cone. For this reason, more expensive materials and processes are required to make the cones but especially the lower one.

While upper cones can be compression molded or injection molded from advanced fiber-filled polymers, the lower cone is typically made from wrapped high strength fiberglass cloth pre-impregnated with epoxy resin in order to be strong enough to resist the compressive forces of the inclined wedges that keep the frac or bridge plug from being pushed down the well during fracking. A typical high strength lower cone is made out of a billet of fiberglass material that is first formed by wrapping pre-preg fiberglass cloth material and curing it with heat. The billet is then machined into the final lower cone shape that includes faceted surfaces for the wedge slips to interface with. The machining of the fiberglass billet is particularly expensive and difficult due to the abrasive nature of the composite cone material.

SUMMARY

It is therefore necessary to optimize the design of the composite frac or bridge plug components to meet higher operational requirements with necessary strength. It is also necessary to optimize downhole tools for lower cost since they are an expendable item in well completion.

It would be desirable to have a frac or bridge plug cone assembly that is entirely molded and did not require machining of the outer shape and dimensions yet meet the strength requirements for deeper and deeper fracking operations. Additionally it would be desirable to have a cone assembly that could be made by semi-automated means versus hand lay-up.

An aspect of the present disclosure includes a cone assembly for use with a frac plug or bridge plug system made by molding a composite reinforcing structural member with an injection molded or compression molded outer shell with optional faceted outer surface or contoured outer surface formed, at least in part, by the molding process.

Another aspect of the present device and system is a composite material cone structural insert element made by filament winding or by wrapping woven cloth and polymeric resin materials and positioned inside an outer cone section to form a cone assembly that achieves the desired faceted outer shape with little or no machining.

A still further feature of the present disclosure is afrac or bridge plug cone assembly made by bonding a composite reinforcing structural member into an injection molded outer cone shell that has the desired faceted features with little or no machining.

The disclosure also includes a cone assembly made by press fitting a composite reinforcing structural member into an injection molded outer cone shell that has the desired cone assembly shape for use with a frac plug or bridge plug system with little or no machining.

The present disclosure also includes a mandrel having a seal member disposed thereon and a slip member located adjacent the injection molded outer cone shell for operating as a frac plug or a bridge plug system.

Aspects of the present disclosure also include methods for using and for forming a cone assembly and a frac plug or bridge plug system. In one example, a method of manufacturing a cone assembly for use with a frac plug or bridge plug system is disclosed. The method can comprise utilizing more than one composite material, forming an inner composite structural component having a tapered outer body, and forming an outer cone section by molding.

The method, wherein the molding step is either injection molding or compression molding a polymer material around a filament would fiber material.

The method, wherein the molding step for the outer cone section is performed separately or away from the inner composite structural component.

The method, wherein the forming step for the inner composite structural element comprises winding a fiber material around a mandrel.

The method, wherein the cone assembly is formed by injection molding or compression molding an outer cone section over the inner composite structural component made by a filament winding process and wherein the outer cone section and the inner composite structural component are each sized and shaped for optimized load conditions during use.

A still further feature of the present disclosure is a filament wound structural composite ring to handle the compressive crushing loads imposed by the wedge slips.

A still yet further feature of the present disclosure is a molded outer shell with the necessary material compressive strength to handle the wedge slip interface stresses.

The present disclosure is also understood to include a cone assembly for use with a frac plug or bridge plug system, said cone assembly comprising an inner reinforcing structural member made from a composite material and having a bore and an outer shell disposed over the inner reinforcing structural member, said outer shell being made by injection molding or compression molding and has a shaped outer molded surface; and wherein the outer shell has a first end of a first diameter and a second end of a second diameter, which is larger than the first diameter.

The cone assembly wherein the inner reinforcing structural member may be made by filament winding or by wrapping woven cloth and polymeric resin materials.

The cone assembly wherein the outer shell has a plurality of spaced apart fins each extending radially outwardly from the shaped outer molded surface and wherein at least one tapered surface is located between two adjacent fins.

The cone assembly wherein the inner reinforcing structural member can be located inside a mold and the outer shell is formed over the inner reinforcing structural member while inside the mold.

The cone assembly wherein the outer shell can be bonded to the inner reinforcing structural member.

The cone assembly wherein the outer shell may have a press fit with the inner reinforcing structural member.

The cone assembly can further comprise a mandrel located in the bore of the inner reinforcing structural member and wherein a seal member and a slip member are located on the mandrel.

The present disclosure is still further understood to include a method of manufacturing a cone assembly for use with a frac plug or bridge plug system. The method can comprise the steps of utilizing more than one composite material; forming an inner composite structural component having a tapered outer body with a first composite material, molding an outer cone section for use with the inner composite structural, said molding comprising the use of a second composite material; wherein the inner composite structural component has a first open end, a second open, and a bore extending therebetween; and wherein the outer cone section has a tapered outer surface section formed by molding.

The method wherein the molding step can either be injection molding or compression molding a polymer material around a filament would fiber material.

The method wherein the molding step can be performed separately from the inner composite structural component.

The method wherein the forming step for the inner composite structural element can include winding a fiber material around a mandrel.

The method wherein the cone assembly may be formed by injection molding or compression molding the outer cone section over the inner composite structural component, which may be made by a filament winding process.

The method wherein the outer cone section can include a plurality of spaced apart fins and wherein a tapered surface section can be located between two of the fins.

The method can further comprise placing the inner composite structural component inside a mold before molding the outer cone section over the inner composite structural component.

The method can further comprise the step of placing an elongated mandrel through the bore of the inner composite structural component and placing one or more slip pads in abutting contact with the outer cone section.

The method can further comprise bonding the inner composite structural component and the outer cone section together.

The method can further comprise press fitting the inner composite structural component and the outer cone section together.

BRIEF DESCRIPTION OF THE DRAWINGS

These and other features and advantages of the present device, system, and method will become appreciated as the same becomes better understood with reference to the specification, claims and appended drawings wherein:

DESCRIPTION

The detailed description set forth below in connection with the appended drawings is intended as a description of the presently preferred embodiments of cone assemblies and frac and bridge plug systems provided in accordance with aspects of the present device, system, and method and is not intended to represent the only forms in which the present device, system, and method may be constructed or utilized. The description sets forth the features and the steps for constructing and using the embodiments of the present device, system, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
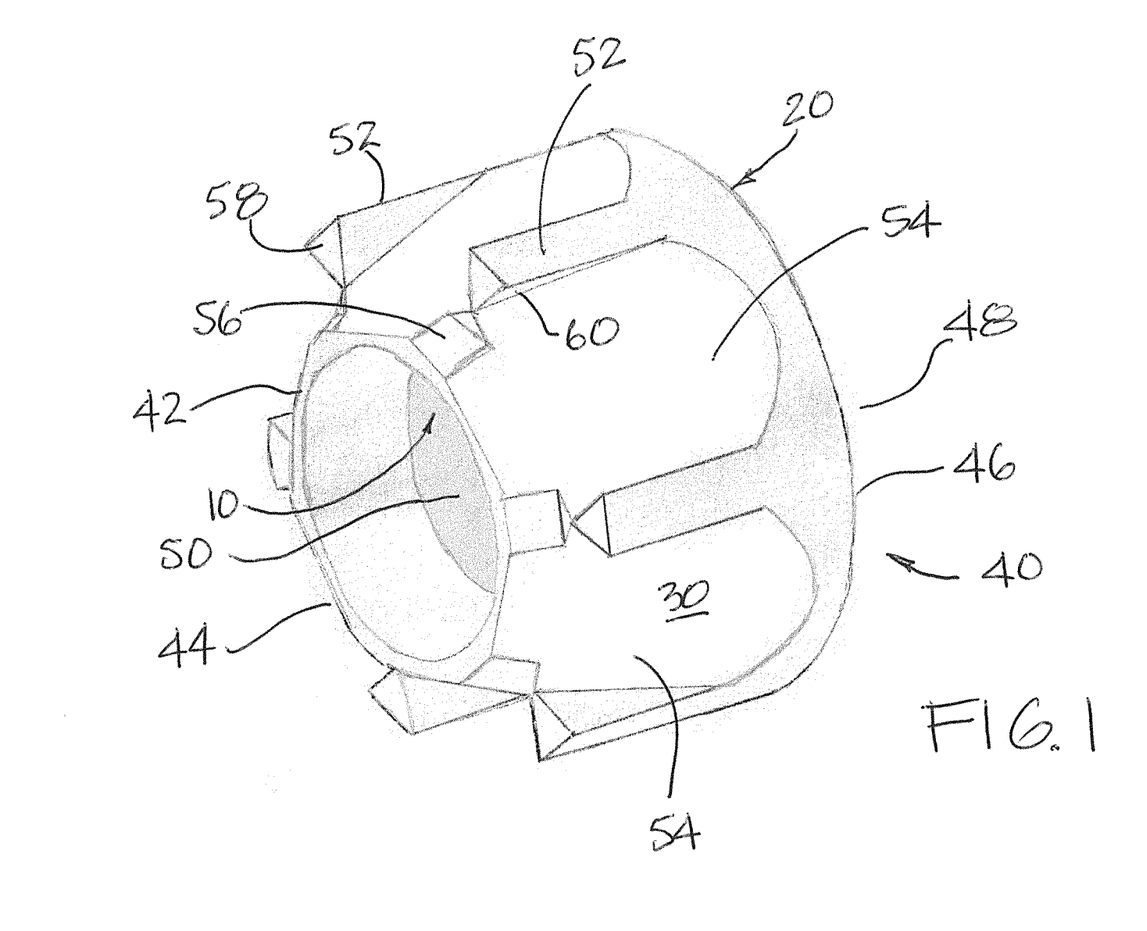
FIG. 1 is a perspective view of a cone assembly provided in accordance with aspects of the present device, system, and method.

FIG. 1 is a perspective view of a cone assembly 40 for use with a downhole bridge plug or frac plug system to activate adjacent slip pads, also known as gripping members or slip members. As further discussed below, the cone assembly 40 comprises an outer cone section 20 and an inner cone structural element 10 (see also FIG. 2), which is termed inner relative to the outer cone section 20 but may be referred to as a first cone assembly and a second cone assembly, respectively. In one example, the outer cone section 20 is co-molded or over-molded to the cone structural element 10. In another example, the outer cone section 20 is compression molded over the cone structural element 10. In still another example, the outer cone section 20 is made from a high strength fiber-filled polymer material and then machined to receive the cone structural element 10, which is wound from a high modulus fiber material, such as carbon fiber, as further discussed below.

As shown, the cone assembly 40 comprises a first end 42 comprising an opening 44 and a second end 46 comprising an opening 48 defining a bore 50 therebetween sized for mounting over a mandrel of a downhole bridge plug or frac plug system. The cone assembly 40 comprises a plurality of tapered sections 54 on the taper body 30 and are each located between adjacent pairs of facets or fins 52. A flat landing section 56 is formed adjacent the open end or end wall 58 of each fin 52 for mating arrangement with the slip element on the downhole bridge plug or frac plug system. Depending on the shape, size, or contour of the mating slip element to be activated by the cone assembly 40, the number of fins 52, the location of the fins, and the contour of the tapered section 54 may change. Thus, aspects of the present device, system, and method are understood to not be limited to the exact embodiment shown in FIG. 1 and that variations in the number of fins, location of fins, contour and tapered sections are within the scope of the present disclosure. In some examples, the end walls 58 of the plurality of fins 52 extend further towards the first end 42. In still other examples, the end walls 58 are flushed with the end first end 42.

Figure 2:
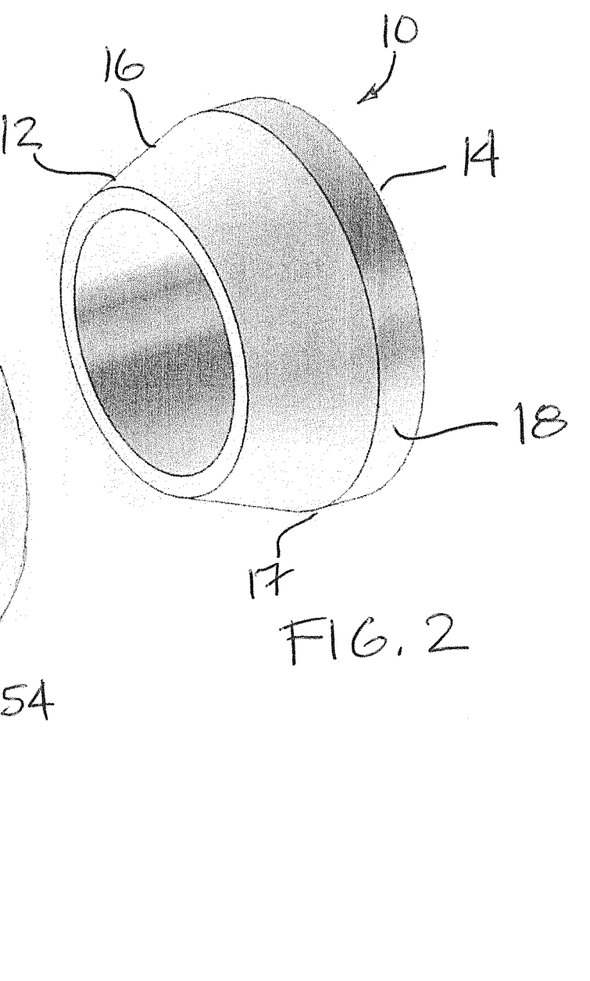
FIG. 2 is a perspective view of an insert or inner cone structural element provided in accordance with aspects of the present disclosure.

FIG. 2 is a perspective view of a cone structural element 10 for use with the outer cone section 20 provided in accordance with aspects of the present device, system, and method. In one example, the cone structural element 10 is formed by filament winding a carbon fiber/epoxy composite cone structure, which comprises a first end 12, a second end 14, and a tapered body section 16 extending therebetween. In an example, a constant internal diameter between the first end 12 and the second end 14 is provided, which defines an increasing wall thickness on the structural element 10 extending from the first end 12 towards the generally constant outer section 18 near the second end 14. The thickness from the transition point 17 towards the second end 14 of the generally constant outer section 18 has a generally constant thickness, although variations may be practiced without deviating from aspects of the present disclosure. For example, the outer contour may have a single slope extending from the first end 12 to the second end 14. In another example, the outer contour has a complex slope from the first end 12 to the second 14 that can vary to enable bonding, securing, and/or varied support at different locations for the outer cone section 20. As shown, the structural element 10 is sufficiently thick for use as an actuating cone element of a bridge plug or frac plug assembly, such as being sufficiently thick to withstand compressive forces in the order of several tons of pressure.

The cone structural element 10 preferably has a fiber orientation of roughly +/−85 degrees although other angles may be useable for forming the cone structural element for certain applications, such as from +/−45 degrees to 90 degrees. While carbon fiber is a preferred material due to its high modulus property, other fibers may be suitable for forming the composite structural element 10, such as fiberglass. Additionally, resins other than epoxy may also be suitable for forming the composite structural element 10, such as phenolic resin. Woven cloth fiber forms may also be used in lieu of filament winding the structural cone element 10.

After the filament wound composite structural element 10 is cured and cut to length, post cure machining to the outside of the filament wound insert 10 may be performed to smooth, round, or further shape the composite structural element. In another example, no machining is performed to the composite structural element 10 after it has been formed other than cutting to length. In yet another example, grit blast is optionally performed to the outer surface of the structural insert 10 to promote adhesion with other components, as further discussed below. In still yet other embodiment, the outer cone shape body section 16 or the constant outer diameter section 18 may incorporate protrusions, projections or recessed sections to facilitate attaching the structural insert element 10 with the outer cone section 20, as further discussed below.

Thus, an aspect of the present device, system, and method is understood to include a composite structural element 10 for use in a cone assembly comprising a body section have a first end with a first opening and a second end with a second opening defining a bore therebetween and wherein the bore comprises a generally constant inside diameter, within acceptable manufacturing tolerances. The present disclosure is further understood to include a composite structural element 10 comprising a tapered outside body section that increases in thickness form the first end towards the second end. As described, the composite structural element 10 can be made from a filament winding process, such as with carbon fiber. In another example, the composite structural element 10 can be made from woven cloth fiber instead of filament winding. As further discussed below, the structural element 10 may be pressed fit or bonded to an outer cone section to form a cone assembly, or both. In another example, the structural element 10 may be used as an insert inside a mold housing or tool for co-molding or over-molding with a fiber-filled polymer material to form the outer cone section 20 around the inner composite structural element 10.

Figure 3:
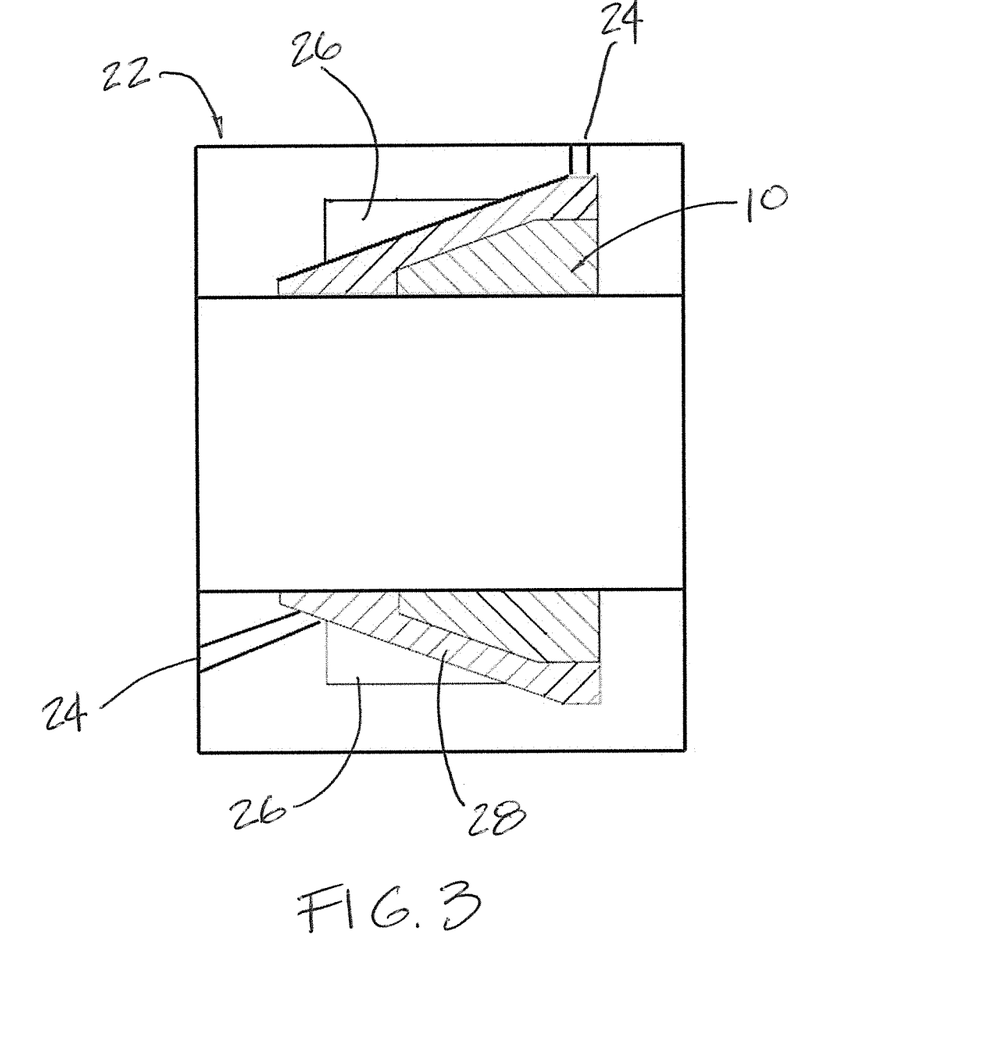
FIG. 3 is a schematic view of the inner cone structural element of FIG. 2 located in a molding tool for molding an outer shell or outer cone section over the inner cone structural element.

With reference now to FIG. 3, the composite structural element 10 is shown placed into an injection mold or compression molding tool 22 to over-mold or co-mold the composite structural element 10 to form a completed cone assembly 40 (FIG. 1). In one example, a high strength fiber-filled polymer (either thermosetting or thermoplastic) is injected into the molding tool 22 through one or more gates or ports 24 to build up around the composite structural element 10, such as to form an outer cone section 20 around the composite structural element 10. The injection mold or compression mold 22 is formed with several faceted shape cavities 26 and a tapered main cavity 28 for forming the tapered body 30 of the outer cone section 20 and the plurality of facets or fins 52. The facets 52 are configured for interfacing with wedge slip elements of the downhole tool assembly and therefore can vary in shape, size, number, orientation, etc. depending on the wedge slip elements to be incorporated in the downhole tool assembly. For example, in some embodiments, the facets may be omitted altogether and/or the particular angle chosen for the tapered body 30 may vary in degree and in continuity, such as being formed with distinct or separate tapered sections.

In another embodiment, rather than injection molding the molding tool 22 with a high strength fiber-filled polymer to form the outer cone section 20 over the inner structural element 10, a blob of curable fiber-filled polymer is filled inside the mold assembly 22 and compression molded over the inner structural element 10. In still yet another embodiment, the mold assembly 22 may have a single large cavity for co-molding or over-molding the outer cone section 20 to the structural insert element 10 into a billet. After curing, the billet may be machined, such as with a CNC or milling machine, to form various facets, fins, and/or shaped surfaces to form the cone assembly 40.

Figure 4:
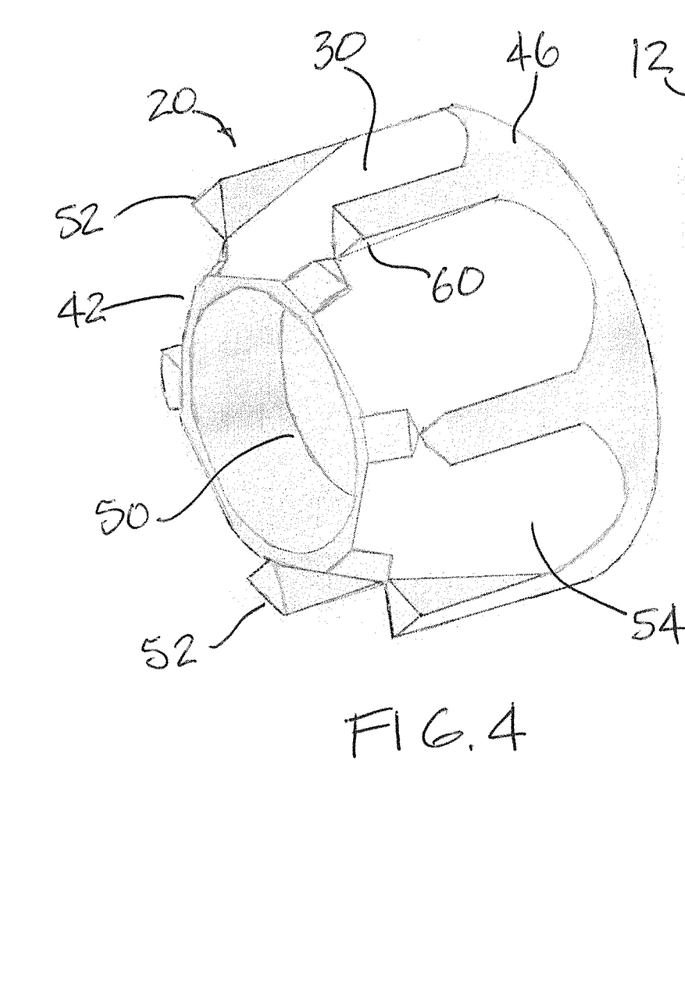
FIG. 4 is perspective view of the outer shell or cone assembly of FIG. 1, which may be separately formed and subsequently assembled with the insert element of FIG. 2 or by injection molding or compression molding directly over the inner cone structural element.

With reference now to FIG. 4 in addition to FIG. 2, the composite structural element 10 may be machined to shape in accordance with another aspect of the present disclosure for use with the outer cone section 20 to produce a cone assembly having at least two different composite materials. For example, the machined composite structural element 10 may be inserted into the second end of the outer cone section 20 and bonded, press fit thereto, or both to form the cone assembly 40 of FIG. 1. In another example, the structural cone element 10 is formed and cut to length but not machined. Instead, the bore at the second end 46 of the outer cone section 20 is machined to receive the structural cone element 10. For example, the inside bore of the second end 46 may be machined to accept the composite structural shaped element 10.

Figures 5, 6, 7:
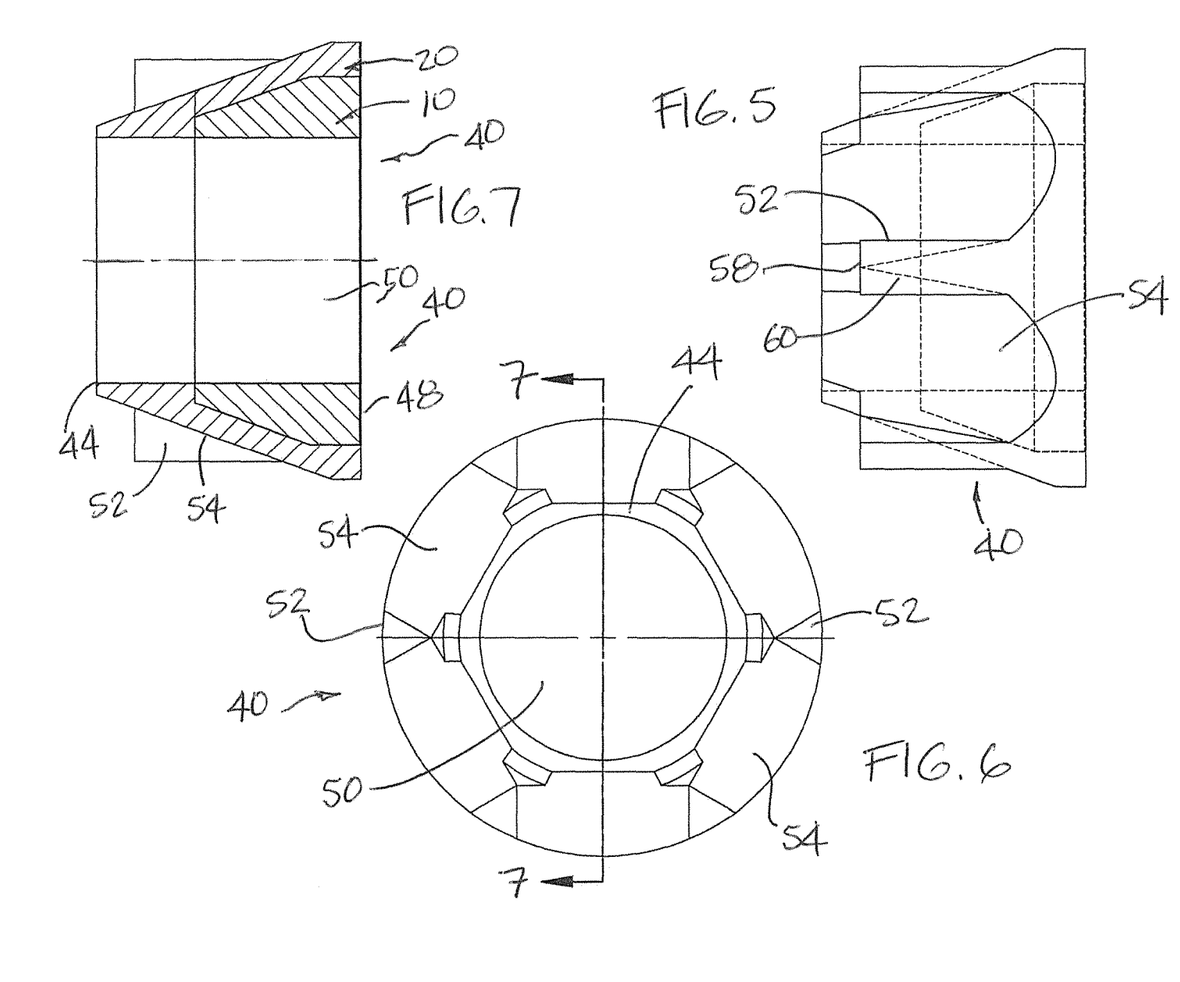
FIG. 5 is a schematic side view of the cone assembly of FIG. 1.
FIG. 6 is a schematic front view of the cone assembly of FIG. 1.
FIG. 7 is a schematic cross-sectional side view of the cone assembly of FIG. 6 taken at line 7-7.

FIG. 5 is a side view of the cone assembly 40 of FIG. 1 with dashed lines, which represent the tapered side walls 60 of the plurality of fins 52. The tapered side walls 60 are better shown the perspective view of FIG. 1. The tapered walls are configured to accommodate adjacent tapered surfaces of adjacent slip members when mounted onto a bridge plug or frag plug assembly.

FIG. 6 is a front view of the cone assembly 40 of FIG. 5.

FIG. 7 is a cross-sectional side view of the cone assembly 40 of FIG. 6 taken along line 7-7. The cross-hatchings of FIG. 7 clearly show the cone shape composite structural component 10 positioned inside the outer cone section 20 to reinforce the overall structural integrity of the cone assembly 40. As discussed above, the composite structural component 10 is made from a filament wound fiber material, such as carbon fiber, with high modulus properties to provide increased resistance to shear and compressive forces experienced in high pressure applications compared to moldable polymer material, as an example. However, moldable high strength fiber-filled polymer (either thermosetting or thermoplastic) allows the cone assembly 40 to be formed with various features, such as contours, angles, shapes, fins 52, other extensions, and/or recesses, more easily and economically by molding them rather than machining them after forming an intermediate cone assembly, such as forming a generally cylindrical billet with a sufficiently thick sidewall to then machine to produce a finished cone assembly. In one example, these various features can be created by forming a mold housing or tool, such as the molding tool 22 of FIG. 2, having shaped cavities for forming negative impressions of the shaped cavities.

Thus, an aspect of the present disclosure is understood to include a cone assembly comprising an inner composite structural element made from a high modulus composite material that reinforces an outer cone assembly made from a relatively lower modulus property material having a tapered body section for acting against a slip member in a downhole assembly. In a particular example, the inner composite structural element is made by filament winding a fiber material around a mandrel and the outer cone section is made from injection molding or compression molding an injectable polymer material inside a molding housing or tool.

Figure 8:
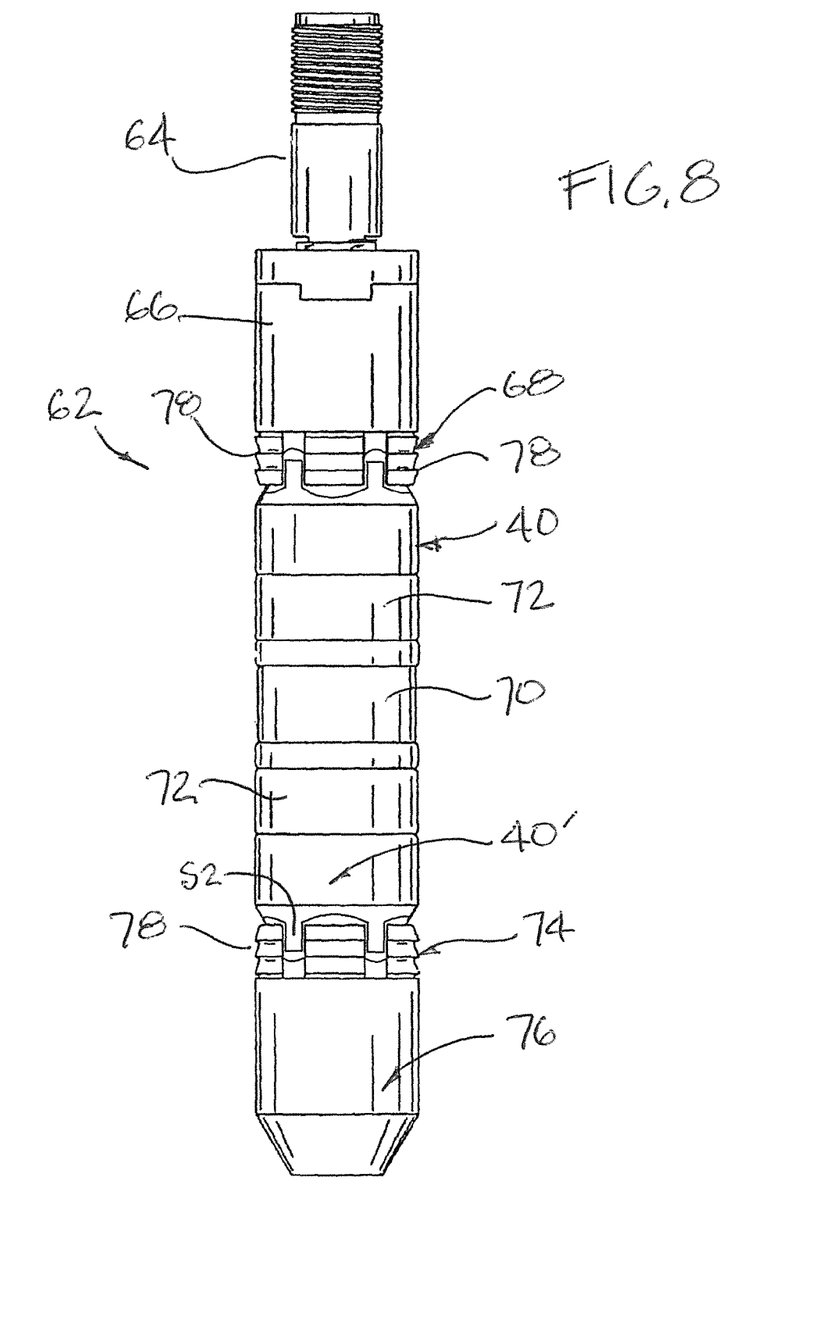
FIG. 8 is a frac plug or bridge plug system having one or more cone assemblies of the present disclosure for activating adjacent slip members.

FIG. 8 is a bridge plug or frac plug system 62 provided in accordance with aspects of the present device, system, and method. As shown, the system 62 includes a mandrel 64, an upper support member 66, an upper slip pad 68, an upper cone member or assembly 40, two intermediate support members 72, a seal member 70, a lower cone member 40', a lower slip pad 74, and a head member 76. Bridge plug and frac plug systems can vary from manufacturer to manufacturer and thus the specific components and number of components described can vary. In general, the system 62 is configured to seal a well bore of a downhole metal casing to isolate a section of the casing upstream of the seal member 70 so that blasting or high pressure fluid can be introduced into the casing to open the well during fracking operation. The seal member 70 seals against the casing by axially compressing the seal member 70 to cause it to expand radially against the inner wall of the casing to seal there against. To keep the seal from moving, the upper slip pad 68 and the lower slip pad 74 are caused to slide over the tapered surfaces 54 (FIG. 1) of the tapered body 30 of the cone assembly 40. This action causes the gripping members 78 of the upper and lower slip pads 68, 74 to project radially outwardly relative to the longitudinal length of the plug system 62 to bite against the interior wall surfaces of the well to keep the seal member stationarily fixed within the well. In another example, because the upper cone assembly 40 is exposed to lower operating pressure than the lower cone assembly 40', a lower cost singularly formed fiber-filled upper cone assembly may optionally be used rather than a multi-part cone assembly having a composite structural element.

In another aspect of the present disclosure, a frac plug or bridge plug system comprising a mandrel, a slip pad disposed on the mandrel comprising a plurality of gripping members, and a cone assembly positioned adjacent the slip pad and comprising a tapered body section, an outer cone section made of a first material, and a composite structural component 10 comprising a second stronger material than the first material is provided. In a particular example, the inner composite structural component 10 is made from a fiber wound filament material. In another example, the composite structural component 10 is made from a woven cloth material. In yet other examples, the cone assembly is one of the cone assembly discussed elsewhere herein and optionally by one of the methods discussed elsewhere herein.

Although limited embodiments of the cone assemblies and frac and bridge plug systems and their components have been specifically described and illustrated herein, many modifications and variations will be apparent to those skilled in the art. Accordingly, it is to be understood that the cone assemblies, frac and bridge plug systems and their components constructed according to principles of the disclosed device, system, and method may be embodied other than as specifically described herein. The disclosure is also defined in the following claims.

What is claimed is:

1. A cone assembly for use with a frac plug or bridge plug system, said cone assembly comprising:
    an inner reinforcing structural member having a body with a bore, a length, a first end of the bore, a second end of the bore opposite the first end of the bore, and the body made from a composite material;
    an outer shell disposed over the inner reinforcing structural member, said outer shell having a shaped outer molded surface comprising tapered sections located between at least two facets that are spaced from the inner reinforcing structural member;
    wherein the outer shell has a length, a first end with an opening of a first diameter and a second end defining a plane with an opening of a second diameter, which is larger than the first diameter, said plane at the second end of the outer shell representing an end-most plane of the cone assembly; and
    wherein the inner reinforcing structural member is located inside the outer shell and extends from the second end of the outer shell towards the first end of the outer shell.

2. The cone assembly of claim 1, wherein the inner reinforcing structural member is made of carbon fiber or woven cloth and polymeric resin materials.

3. The cone assembly of claim 1, further comprising a third facet and a fourth facet having a tapered section located therebetween, said third facet and said fourth facet being spaced from the inner reinforcing structural member.

4. The cone assembly of claim 3, wherein a flat landing section is formed adjacent an end wall of each facet for mating arrangement with a slip element on the bridge plug system.

5. The cone assembly of claim 1, wherein the inner reinforcing structural member is located inside a mold with the outer shell, said mold comprising one or more injection ports.

6. The cone assembly of claim 1, wherein the outer shell is bonded to the inner reinforcing structural member.

7. The cone assembly of claim 1, wherein the outer shell is press fit to the inner reinforcing structural member.

8. The cone assembly of claim 1, further comprising a mandrel located in the bore of the inner reinforcing structural member and wherein a seal member and a slip member are located on the mandrel.

9. The cone assembly of claim 1, wherein the outer shell is a fiber-filled polymer.

10. The cone assembly of claim 1, wherein the second end of the bore of the body of the inner reinforcing structural member defines a plane and wherein the plane of the body of the inner reinforcing structural member and the plane at the second end of the outer shell are coplanar.

11. The cone assembly of claim 1, wherein the length of the outer shell is longer than the length of the inner reinforcing structural member.

12. A method of manufacturing a cone assembly for use with a frac plug or bridge plug system comprising the steps:
forming an inner reinforcing structural member having a body with a bore, a length, a first end of the bore, a second end of the bore opposite the first end of the bore, and the body made from a composite material;
molding an outer shell disposed over the inner reinforcing structural member, said outer shell having a shaped outer molded surface comprising tapered sections located between at least two facets that are spaced from the inner reinforcing structural member;
wherein the outer shell has a length, a first end with an opening of a first diameter and a second end defining a plane with an opening of a second diameter, which is larger than the first diameter, said plane at the second end of the outer shell representing an end-most plane of the cone assembly; and
wherein the inner reinforcing structural member is located inside the outer shell and extends from the second end of the outer shell towards the first end of the outer shell.

13. The method of claim 12, wherein the inner reinforcing structural component is joined to the outer shell by molding the outer shell directly onto the inner reinforcing structural component.

14. The method of claim 12, wherein the outer shell is formed by injection molding or compression molding the outer shell over the inner reinforcing structural component, which is made by a filament winding process.

15. The method of claim 14, further comprising placing the inner reinforcing structural component inside a mold before molding the outer shell over the inner reinforcing structural component.

16. The method of claim 14, further comprising bonding the inner reinforcing structural component and the outer shell together.

17. The method of claim 14, further comprising press fitting the inner reinforcing structural component and the outer shell together.

18. A cone assembly for use with a frac plug or bridge plug system, comprising:
an inner reinforcing structural member having a body with a first end and a second end, said body being made from a composite material and having a bore, and said first end and second end of the body defining a length therebetween;
an outer shell disposed over the inner reinforcing structural member, said outer shell having a length defined by a first end and a second end of said outer shell and a shaped outer molded surface with a tapered section for cooperating with a slip pad;
wherein the outer shell has an opening at the first end and an opening at the second end; and
wherein the length of the outer shell is longer than the length of the body of the inner reinforcing structural member.

19. The cone assembly of claim 18, wherein the outer shell is bonded to the inner reinforcing structural member.

20. The cone assembly of claim 18, wherein a plurality of spaced apart fins are formed with the outer shell and spaced from the inner reinforcing structural member; each fin extending radially outwardly from the shaped outer molded surface and having a flat landing section formed adjacent an end wall of each fin for mating arrangement with a slip element.

21. The cone assembly of claim 18, wherein the outer shell is made from a fiber-filled polymer.

22. The cone assembly of claim 21, wherein the first end of the outer shell defines a first plane and the second end of the inner reinforcing structural member and the second end of the outer shell define a second plane.

23. The cone assembly of claim 22, wherein the outer shell has a bore and the bore of the outer shell and the bore of the body of the inner reinforcing structural member define a common bore of the cone assembly.

* * * * *

UNITED STATES PATENT AND TRADEMARK OFFICE
CERTIFICATE OF CORRECTION

PATENT NO. : 9,995,107 B2
APPLICATION NO. : 14/062501
DATED : June 12, 2018
INVENTOR(S) : Dennis Sherlin

Page 1 of 1

It is certified that error appears in the above-identified patent and that said Letters Patent is hereby corrected as shown below:

In the Specification

In Column 2, Line 16, delete "afrac" and insert -- a frac --, therefor.

Signed and Sealed this
Twenty-sixth Day of March, 2019

Andrei Iancu
*Director of the United States Patent and Trademark Office*